US011476708B2

(12) United States Patent
Schaefer et al.

(10) Patent No.: US 11,476,708 B2
(45) Date of Patent: *Oct. 18, 2022

(54) PERSONAL CARE PRODUCT DOCKING SYSTEM WITH FLUX GUIDING MEMBERS

(71) Applicant: The Gillette Company LLC, Boston, MA (US)

(72) Inventors: Robert Schaefer, Frankfurt (DE); Klaus Heubach, Koenigstein (DE); Jian Wang, Frankfurt am main (DE); Norbert Broemse, Bad Homburg (DE)

(73) Assignee: The Gillette Company LLC, Boston, MA (US)

( * ) Notice: Subject to any disclaimer, the term of this patent is extended or adjusted under 35 U.S.C. 154(b) by 928 days.

This patent is subject to a terminal disclaimer.

(21) Appl. No.: 15/866,666

(22) Filed: Jan. 10, 2018

(65) Prior Publication Data

US 2018/0212466 A1  Jul. 26, 2018

(30) Foreign Application Priority Data

Jan. 20, 2017  (EP) .................................... 17152533

(51) Int. Cl.
*H02J 7/00* (2006.01)
*H02J 50/10* (2016.01)
(Continued)

(52) U.S. Cl.
CPC .............. *H02J 50/10* (2016.02); *A45D 27/29* (2013.01); *B26B 19/3853* (2013.01);
(Continued)

(58) Field of Classification Search
CPC .......... H02J 50/10; H02J 7/025; H02J 7/0044; H01F 7/0242; A45D 27/29; B26B 19/3853; B26B 19/3873
See application file for complete search history.

(56) References Cited

U.S. PATENT DOCUMENTS 5,680,028 A * 10/1997 McEachern ............ A61C 17/22
320/108
5,923,544 A * 7/1999 Urano ..................... H02J 7/025
363/22
(Continued)

FOREIGN PATENT DOCUMENTS

JP         5303929 B2    7/2013
WO    WO 2010/134051   11/2010

OTHER PUBLICATIONS

PCT International Search Report with Written Opinion in corresponding international application PCT/US2018/013240 dated Apr. 16, 2018.
(Continued)

*Primary Examiner* — Robert Grant
(74) *Attorney, Agent, or Firm* — John M. Lipchitz

(57) ABSTRACT

A personal care product system is provided. The personal care product system has a stand that has a first stand permanent docking magnet. A stand inductive charging coil is also positioned within the stand. A handle that has a first handle permanent docking magnet is removably mounted to the stand. A handle inductive charging coil is positioned within the handle. A handle flux guiding member is in close proximity to a surface of the first handle permanent docking magnet to direct a magnetic field away from the inductive charging coils.

20 Claims, 12 Drawing Sheets

(51) Int. Cl.
    *B26B 19/38*     (2006.01)
    *A45D 27/29*     (2006.01)
    *H02J 7/02*     (2016.01)
    *H01F 7/02*     (2006.01)

(52) U.S. Cl.
    CPC ....... *B26B 19/3873* (2013.01); *H01F 7/0242* (2013.01); *H02J 7/0044* (2013.01); *H02J 7/025* (2013.01)

(56) References Cited

U.S. PATENT DOCUMENTS

| | | | |
|---|---|---|---|
| 9,143,041 | B2 | 9/2015 | Itabashi |
| 9,419,468 | B1 * | 8/2016 | Pierson ................ H02J 7/025 |
| 2009/0056141 | A1 * | 3/2009 | Barry ................ A45D 27/29 30/41.7 |
| 2012/0112553 | A1 | 5/2012 | Stoner, Jr. et al. |
| 2015/0359704 | A1 * | 12/2015 | Imboden ............... A61H 19/00 601/72 |
| 2017/0094399 | A1 * | 3/2017 | Chandramohan .. A45C 13/1069 |
| 2018/0021117 | A1 * | 1/2018 | Kitagawa ............... A61C 17/22 15/22.1 |
| 2018/0041058 | A1 * | 2/2018 | Goldberg ............... H02J 50/10 |

OTHER PUBLICATIONS

U.S. Appl. No. 15/866,611, filed Jan. 10, 2018, Robert Schaefer et al.
U.S. Appl. No. 15/866,677, filed Jan. 10, 2018, Robert Schaefer et al.
EPO Search Report with Written Opinion in corresponding EPO application 17152533.0 dated Apr. 24, 2017.

\* cited by examiner

PERSONAL CARE PRODUCT DOCKING SYSTEM WITH FLUX GUIDING MEMBERS

FIELD OF THE INVENTION

The present disclosure provides for a docking and charging system for a personal care product.

BACKGROUND OF THE INVENTION

Personal care products include dry shaving razors and wet shaving razors, among other types of grooming and hygiene-related implements. Some personal care products include powered elements, such as fluid pumps, motors, sensors, vibrating or oscillating components, heating elements, and so forth, which receive power from an onboard rechargeable power source, such as a battery. For a personal care product that has a rechargeable power source, the personal care product is typically connected to a power supply between uses so that the rechargeable power source can be replenished.

Personal care products with a rechargeable power source have charging modules that may include various components, such as charge coils, mounting clips, leads, and the like, which are typically positioned internal to the product. Due to the form factor of various types of personal care products and other physical limitations, very limited internal space may be available for positioning such components. As such, in order to accommodate the charging components, the size of the personal care product may need to be undesirably increased to enlarge the internal space, or the components of the charging module may need to be internally positioned in relatively undesirable locations.

Further, some personal care products utilize magnets to selectively couple the personal care product to an energized stand. In such configurations, a first docking magnet can be coupled to the personal care product and a second docking magnet can be coupled to the energized stand. When the personal care product is brought into contact with the energized stand, the magnetic fields of the docking magnets can hold the personal care product in place. As described above, however, the internal space available for positioning the docking magnet may undesirably limit the placement location of the docking magnets. Further, for personal care products that also utilize inductive charging systems, the magnetic fields generated by the docking magnets may decrease the efficacy of the inductive charging system. In order to mitigate undesirable interference from the magnetic fields of the docking magnets, the distance between the docking magnets and various components of the inductive charging system may be increased. However, increasing this distance may limit options with regard to how the personal care product can be docked to the energized stand or otherwise undesirably impact the design or operation of the personal care product.

Thus, it would be advantageous to provide for a personal care product docking and charging system that addresses one or more of these issues. Indeed, it would be advantageous to provide for a personal care product that can internally accommodate an inductive charging system while also maintaining a relatively small form factor. It would be advantageous to also provide for an energized stand that can internally accommodate an internal charging module while maintaining a desired form factor. It would be further advantageous to provide for charging modules in a personal care product and an energized stand having components positioned relatively closely to the docking magnets. It would be further advantageous to provide for a personal care product docking system in which the magnetic fields of the docking magnets have relatively minimal impact on the efficacy of an inductive charging system. It would also be advantageous to provide for a personal care product docking and charging system that improves the efficiency of an inductive charging system by facilitating proper alignment of the charging module of the personal care product with the charging module of the energized stand.

SUMMARY OF THE INVENTION

The present disclosure fulfills the needs described above by, in one embodiment, providing a personal care product system comprising a stand, a first stand permanent docking magnet positioned within the stand, and a stand inductive charging coil positioned within the stand. The personal care product system further comprises a handle removably mounted to the stand and a rechargeable battery positioned within the handle. A first handle permanent docking magnet is positioned within the handle that is configured to generate an attraction force sufficient to hold the handle to the stand when placed in proximity to the first stand permanent docking magnet. A handle inductive charging coil is positioned within the handle. The stand inductive charging coil is configured to generate a magnetic field that penetrates the handle inductive charging coil to charge the rechargeable battery when placed in proximity to the handle inductive charging coil. The personal care product system further comprises a handle flux guiding member having at least a portion positioned within the handle inductive charging coil and a stand flux guiding member having at least a portion positioned within the stand inductive charging coil.

In another embodiment, a personal care product system comprises a stand, a first stand permanent docking magnet positioned within the stand, and a stand inductive charging coil positioned within the stand. A handle is removably mounted to the stand. A rechargeable battery is positioned within the handle. A first handle permanent docking magnet is also positioned within the handle and configured to generate an attraction force sufficient to hold the handle to the stand when placed in proximity to the first stand permanent docking magnet. A handle inductive charging coil is positioned within the handle. The stand inductive charging coil is configured to generate a magnetic field that penetrates the handle inductive charging coil to charge the rechargeable battery. The personal care product system also comprises a handle flux guiding member in close proximity to a surface of the first handle permanent docking magnet.

In yet another embodiment, a personal care product system comprises a stand. A first stand permanent docking magnet is positioned within the stand and a stand inductive charging coil is positioned within the stand. A handle is removably mounted to the stand and a rechargeable battery is positioned within the handle. The personal care product system further comprises a first handle permanent docking magnet positioned within the handle configured to generate an attraction force sufficient to hold the handle to the stand when placed in proximity to the first stand permanent docking magnet. A handle inductive charging coil is positioned within the handle. The stand inductive charging coil is configured to generate a magnetic field that penetrates the handle inductive charging coil to charge the rechargeable battery. The personal care product system further comprises a first handle flux guiding member having at least a portion positioned within the handle inductive charging coil. The personal care product system further comprises a second handle flux guiding member in close proximity to a surface of the first handle permanent docking magnet. The personal care product system further comprises a first stand flux guiding member having at least a portion positioned within the stand inductive charging coil.

BRIEF DESCRIPTION OF THE DRAWINGS

The above-mentioned and other features and advantages of the present disclosure, and the manner of attaining them, will become more apparent, and the disclosure itself will be better understood by reference to the following description of nonlimiting embodiments of the disclosure taken in conjunction with the accompanying drawings, wherein.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION OF THE INVENTION

The present disclosure provides for personal care product systems having a handle and a stand for docking and charging the handle when not in use. Various nonlimiting embodiments of the present disclosure will now be described to provide an overall understanding of the principles of the function, design, and operation of the personal care product systems. One or more examples of these nonlimiting embodiments are illustrated in the accompanying drawings. Those of ordinary skill in the art will understand that the methods described herein and illustrated in the accompanying drawings are nonlimiting example embodiments and that the scope of the various nonlimiting embodiments of the present disclosure are defined solely by the claims. The features illustrated or described in connection with one nonlimiting embodiment may be combined with the features of other nonlimiting embodiments. Such modifications and variations are intended to be included within the scope of the present disclosure.

Figure 1:
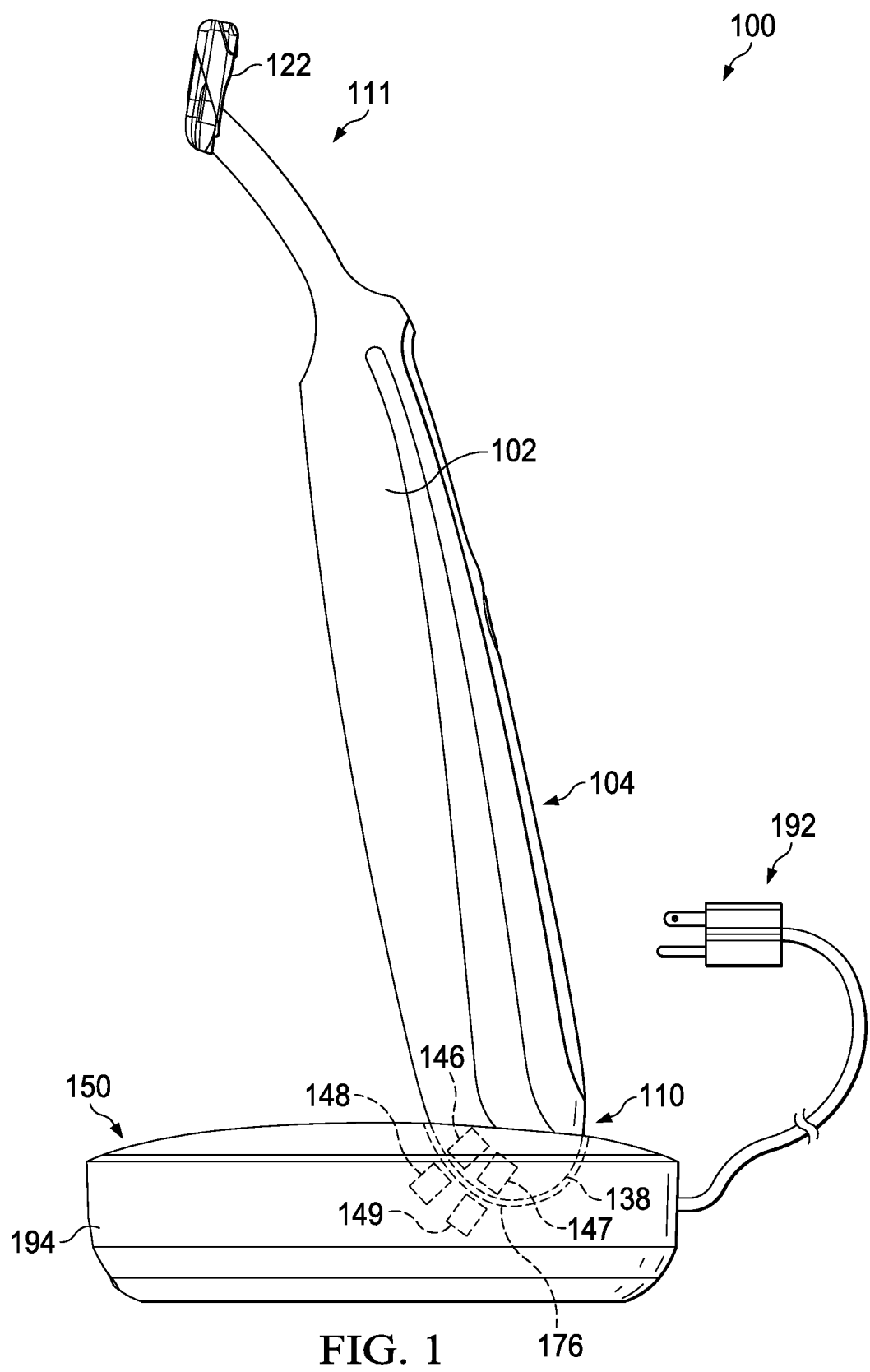
FIG. 1 is a side view of an exemplary personal care product system in accordance with one nonlimiting embodiment of the present disclosure.
Figure 2:
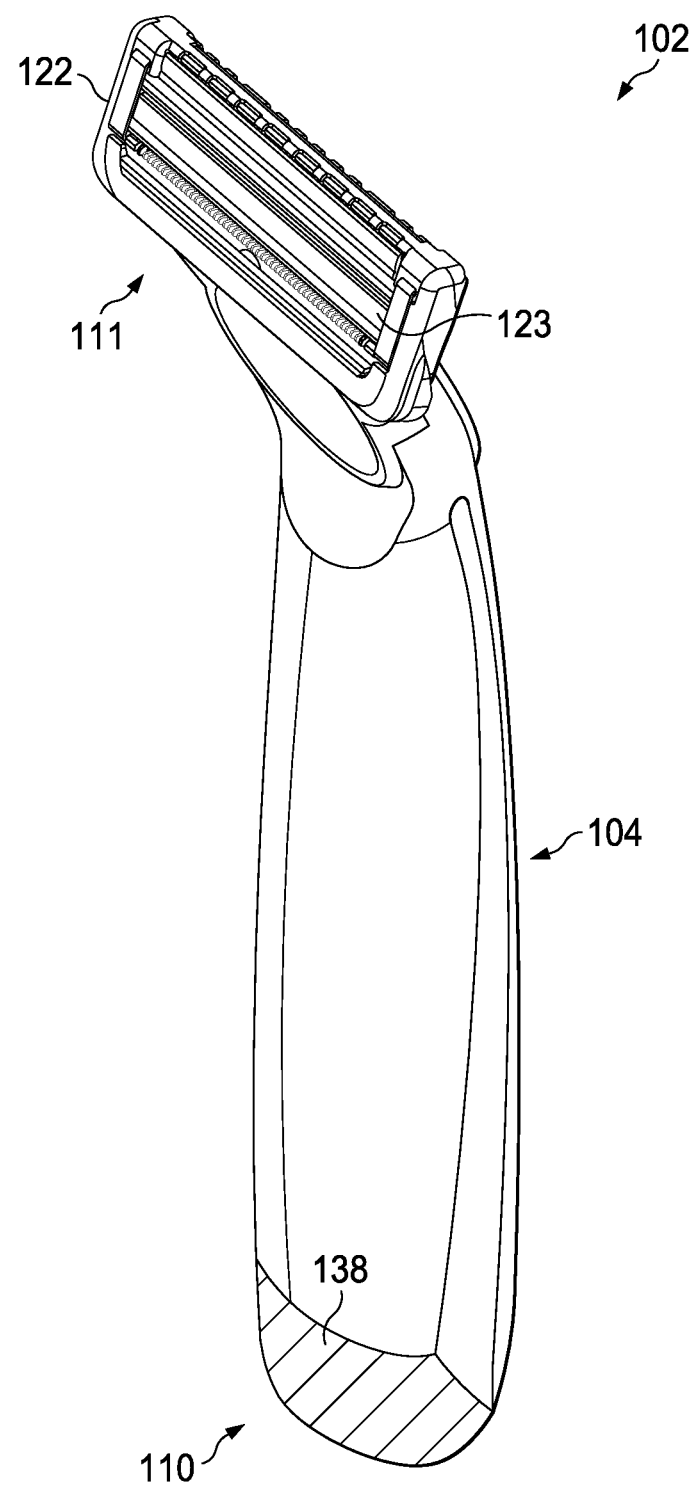
FIG. 2 is an isometric view of a handle.

Referring now to FIG. 1, a side view of an exemplary personal care product system 100 is depicted in accordance with one nonlimiting embodiment of the present disclosure. FIG. 2 depicts an isometric view of the handle 102. Referring to FIGS. 1-2, the personal care product system 100 comprises a handle 102 that is docked with a stand 150. While the handle 102 is shown as a rechargeable wet razor having powered components, such depiction is for illustrative purposes only. Other examples of personal consumer products that can be docked to the stand 150 may include, without limitation, dry razors, epilators or other hair cutting and/or epilating household devices, trimmers, personal groomers, toothbrushes, hair removal devices, and so forth. Further, while a shaving razor cartridge 122 having blades 123 (FIG. 2) is depicted as being coupled to a distal end of a second end portion 111 of the handle 102, in other embodiments the handle 102 may additionally or alternatively include other types of grooming devices, such as perforated shaving foils, rotary cutters, oscillating cutters, trimmers, and so forth. Accordingly, the handle 102 with the depicted shaving razor cartridge 122 coupled to the second end portion 111 is for illustrative purposes only and is not intended to limit the disclosure to any particular configuration of the handle 102, the personal care product system 100, or the shaving razor cartridge 122. The handle 102 may include one or more powered elements, such as fluid pumps, motors, sensors, vibrating or oscillating components, heating elements, and so forth. As used herein, the term handle 102 is to refer to the personal grooming device that can be stored in the stand 150, including any attachable components, such as the shaving razor cartridge 122. Further, while the handle 102 is shown to have a generally cylindrical elongated gripping portion 104, this disclosure is not so limited. Instead, the elongated gripping portion 104 can be any suitable shape, size, or configuration and is the portion of the handle 102 that is handled by the user during use of the personal care product. The shaving razor cartridge 122 (or other type of attachment or fixed implement) may be fixedly or pivotably mounted to the handle 102, depending on the overall desired cost and performance. The shaving razor cartridge 122 may be permanently attached or removably mounted to the handle 102. The shaving razor cartridge 122 may include one or more blades 123, or other cutting instruments.

The handle 102 is shown in a docked position in FIG. 1, with at least a portion of a first end portion 110 of the handle 102 being received into the stand 150. While in the docked position, only the outer surface contact area 138 (FIG. 2) at the first end portion 110 of the handle 102 contacts the stand 150, with a remainder of the handle 102 suspended without touching a base 194 of the stand 150 or other type of physical support. As described in more detail below, the stand 150 can include a stand docking system 149 and the handle 102 can include a handle docking system 147. One or both of the stand docking system 149 and the handle docking system 147 may include one or more docking magnets. While in the docked position, the stand docking system 149 can be magnetically couple to the handle docking system 147 in order to maintain the handle 102 in the docked position until a user removes the handle 102 from the stand 150 by lifting the handle 102 off the stand 150.

The stand 150 can include the base 194 and a power plug 192 that can be plugged into a power source, such as a wall outlet. The stand 150 can further include an inductive charging system comprising a stand charging module 148. The stand charging module 148 can inductively deliver power to a handle charging module 146 of the handle 102 when the stand 150 is connected to a power source and the handle 102 is docked to the stand 150. While the power plug 192 is shown in FIG. 1 as being a conventional wall plug, in other configurations different power plug configurations can be used, such as USB chargers, for example. In yet other embodiments, the stand 150 comprises a rechargeable power source that is configured to store power and then charge the handle 102 when it is docked with the stand. The handle 102 may hold a power source 119 (FIG. 3) that is in electrical communication with the handle charging module 146 and supplies power to one or more of the onboard powered elements, such as a heating element, a motor, a vibrating element, or other type of element driven by electricity. The power source 119 may be a rechargeable battery or other power accumulator that is recharged through inductive charging while the handle 102 is docked in the stand 150 while not in use.

Figure 3:
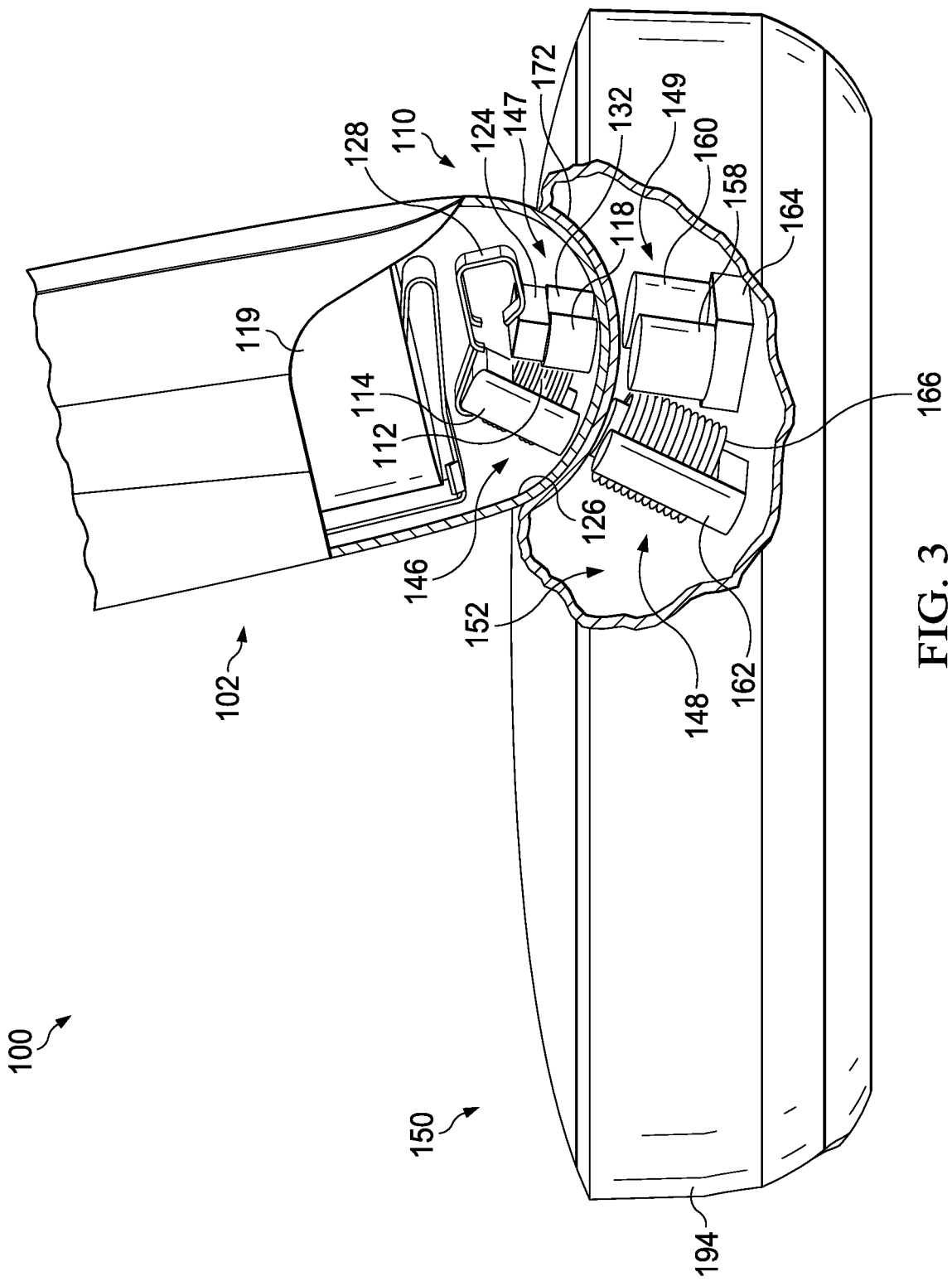
FIG. 3 is a partial cutaway view of a first end portion of a handle that is docked with a stand, with various components removed for clarity of illustration.

FIG. 3 is a partial cutaway view of the first end portion 110 of the handle 102 docked with the stand 150, as shown in FIG. 1, with various components removed for clarity of illustration. The handle docking system 147 of the handle 102 is depicted as including docking magnets 118, 132. The stand docking system 149 of the stand 150 is depicted as including docking magnets 158, 160. While the number and shape of docking magnets can vary, in the illustrated configuration, the handle 102 has a first docking magnet 118 that is positioned beside a second docking magnet 132, both of which may be substantially cylindrical. Similarly, the stand 150 has a first docking magnet 158 that is positioned beside a second docking magnet 160, both of which are substantially cylindrical and mounted within a cavity 152 defined by the stand 150.

When the handle 102 is being docked, the outer surface contact area 138 is placed in contact with an outer contact surface 176 (FIG. 1), such that the docking magnets 118, 132 of the handle 102 are positioned proximate to and generally aligned with the docking magnets 158, 160 of the stand 150. Once in this position, the magnetic attraction between the docking magnets maintains the position of the handle 102 relative to the stand 150 to overcome the gravitational force acting upon on the handle 102. Aligning the docking magnets 118, 132 of the handle 102 to the docking magnets 158, 160 of the stand 150 can beneficially increase the strength of the magnetic attraction between the handle 102 and the stand 150. The handle 102 can remain in this position until the user lifts the handle 102 off the stand 150.

The handle charging module 146 of the handle 102 is configured to receive power from the stand charging module 148 when the handle 102 is docked to the stand 150. The handle charging module 146 can use the power received from the stand charging module 148 to recharge the power source 119 of the handle 102. In the illustrated configuration, each of the handle charging module 146 and the stand charging module 148 comprises at least one coil that facilitates inductive charging. In the illustrated configuration, the stand charging module 148 has a stand inductive charging coil 166 and the handle charging module 146 has a handle inductive charging coil 112. When the handle 102 is in the docked position, the stand inductive charging coil 166 (i.e., a transmitter) and the handle inductive charging coil 112 (i.e., a receiver) magnetically couple such that a magnetic field from the transmitter penetrates the receiver before returning to the transmitter via a return path. Since the handle inductive charging coil 112 is electrically coupled to the power source 119, the power source 119 may be recharged while the handle 102 is in the docked position through this inductive charging process.

Besides penetrating the handle inductive charging coil 112, the magnetic field generated during inductive charging can potentially also penetrate other components positioned within the handle 102. Additionally, the stray magnetic field can cause noise in conductive materials (e.g., integrated circuits, printed circuit board traces, etc.) and create electromagnetic interference issues. The stray magnetic field can also cause eddy currents in conductive objects, which can generate heat and decrease the magnetic field strength.

In order to mitigate various undesirable side effects of inductive charging, a first handle flux guiding member 114 and a first stand flux guiding member 162 can be utilized, example configurations of which are shown in FIG. 3. Each of the first handle flux guiding member 114 and the first stand flux guiding member 162 can comprise a magnetic material that allows them to influence the magnetic field in its environment. A material such as ferrite, for instance, has a greater permeability to a magnetic field than air and therefore concentrates the magnetic field lines. By strategic placement and design of the first handle flux guiding member 114 and the first stand flux guiding member 162, the magnetic field associated with the inductive charging system can be concentrated and shaped, such that the efficiency of the inductive charging system is improved and undesirable coupling effects with other components of the handle 102 and the stand 150 are reduced. Further, the first handle flux guiding member 114 and the first stand flux guiding member 162 can screen or otherwise guide the flux from external sources that may produce magnetic fields that penetrate the handle inductive charging coil 112.

In some configurations, as shown in FIG. 3, the first stand flux guiding member 162 can directly contact an inner surface 172 of the stand 150 and the first handle flux guiding member 114 can directly contact the inner contact surface 126. While the shape and style of the flux guiding members can vary, in the illustrated configuration the first handle flux guiding member 114 and the first stand flux guiding member 162 are U-shaped and each at least partially extends through the handle inductive charging coil 112 and the stand inductive charging coil 166, respectively. As shown, each of the first handle flux guiding member 114 and the first stand flux guiding member 162 may have a leg that is cylindrical and have an outer diameter slightly smaller than the inner diameter of the respective charging coil, such that the gap between in the inside surface of each of the coils 166, 112 and the outer surface of the respective flux guiding member is minimized. While each of the first handle flux guiding member 114 and the stand flux guiding member 162 are shown as being U-shaped, this disclosure is not so limited. As described in more detail below, the configuration, size, shape, and arrangement of the first handle flux guiding member 114 and the stand flux guiding member 162 can vary.

As shown in FIG. 3, the handle charging module 146 is positioned in close proximity to the first docking magnet 118 and the second docking magnet 132, all of which are positioned within the first end portion 110. Similarly, the stand charging module 148 is positioned in close proximity to the first docking magnet 158 and the second docking magnet 160. Each of the first docking magnet 118 and the second docking magnet 132 and the first docking magnet 158 and the second docking magnet 160 generate a magnetic field. Due to the close proximity to the handle charging module 146 and stand charging module 148, the magnetic field can potentially impact the efficacy of those systems. In order to mitigate the impact, flux guiding members can be utilized to harness and concentrate the magnetic field of some or all of the docking magnets 118, 132, 158, 160.

Referring first to the handle 102, a second handle flux guiding member 124 is positioned proximate to the first docking magnet 118 and the second docking magnet 132. The second handle flux guiding member 124 can be in close proximity with a surface 181, 183 (FIG. 5) of each of the first docking magnet 118 and the second docking magnet 132 to aid in directing the magnetic field through the second handle flux guiding member 124. In some embodiments, for instance, the second handle flux guiding member 124 is in direct contact with the surface 181, 183 (FIG. 5) of each of the first docking magnet 118 and the second docking magnet 132. In other embodiments, the second handle flux guiding member 124 is spaced from the surfaces 181, 183, such as to allow for an adhesive, for example. In some embodiments, the second handle flux guiding member 124 is spaced from the surfaces 181, 183 to form an air gap or to allow for manufacturing tolerances, for example. In the illustrated arrangement, the second handle flux guiding member 124 is positioned such that the magnetic field is routed from the pole of the first docking magnet 118 to the pole of the second docking magnet 132. The pole of the first docking magnet 118 is opposite of the pole of the second docking magnet 132. By directing a majority of the magnetic field through the second handle flux guiding member 124, the magnetic field is less likely to interfere with the handle charging module 146 or the stand charging module 148. As such, the first docking magnet 118 and the second docking magnet 132 can beneficially be positioned within the handle 102 in close proximity to handle charging module 146, as the magnetic field of those docking magnets can be directed away from the handle inductive charging coil 112. Additionally, by collecting and concentrating the magnetic flux of the first docking magnet 118 and the second docking magnet 132, the magnetic attraction between the handle 102 and the stand 150 can beneficially be increased, thereby increasing the docking strength.

The second handle flux guiding member 124 can be ferrimagnetic material or ferromagnetic material such that it has a greater permeability to a magnetic flux than the air around it. The size and shape of the second handle flux guiding member 124 can vary. In some configurations, as is shown in the illustrated example, the second handle flux guiding member 124 may be a rectangular bar. However, any of a variety of suitable shapes may be used that concentrate and direct the magnetic flux of the first docking magnet 118 and the second docking magnet 132. Further, the magnetic flux can either be guided from one docking magnet 118 to the other docking magnet 132, or when a single docking magnet is utilized, the second handle flux guiding member 124 can direct the magnetic field away from the handle inductive charging coil 112 and towards a flux guiding member of the stand 150, for instance. In embodiments utilizing only a single docking magnet, the second handle flux guiding member 124 can have an L-shaped cross section.

In certain embodiments, a biasing member, such as spring 128 can provide a biasing force to press the handle docking magnets 118, 132 against the inner contact surface 126 of the handle 102. With the docking magnets 118, 132 pressed against the inner contact surface 126, the attraction to the stand docking magnets 158, 160 can be maximized. A similar spring can be positioned within the stand 150 to provide a biasing force to press the docking magnets 158, 160 against the inner surface 172 of the stand 150. In other configurations, the docking magnets 158, 160 are pressed into respective pockets of the stand 150 and fixed by hot stamping.

Referring now to the stand 150, a second stand flux guiding member 164 can optionally be positioned proximate to the first docking magnet 158 and the second docking magnet 160. In other low-profile configurations, however, the stand 150 may not utilize a second stand flux guiding member 164, as the overall height of the stand 150 may limit the option to fit a second stand flux guiding member 164 underneath the first docking magnet 158 and the second docking magnet 160. Alternatively, a relatively thin second stand flux guiding member 164 may be used to contact each of the first docking magnet 158 and the second docking magnet 160 in order to provide at least some management of the magnetic flux of the first docking magnet 158 and the second docking magnet 160 while also allowing for a low-profile form factor of the stand 150.

The second stand flux guiding member 164 can be in direct contact with, or at least in close proximity to, a surface of each of the first docking magnet 158 and the second docking magnet 160 to aid in directing the magnetic field through the second stand flux guiding member 164. As such, the first docking magnet 158 and the second docking magnet 160 can beneficially be positioned within the stand 150 in close proximity to the stand charging module 148, as the amount of magnetic flux from those docking magnets penetrating the stand inductive charging coil 166 can be limited. The second handle flux guiding member 164 can be preferably made from a material with high magnetic permeability such as a ferrimagnetic or ferromagnetic material. The size and shape of the second handle flux guiding member 164 can vary. In some configurations, the second stand flux guiding member 164 is sized and shaped similar to the second handle flux guiding member 124 and made from a similar material. The second stand flux guiding member 164 can be shaped such that it has a portion that generally aligns with a complementary portion of the second handle flux guiding member 124 when the handle 102 is docked to the stand 150. In other configurations, the flux guiding members have different shapes, as may be required due to the form factors of the stand 150 and the handle 102. In any event, the second stand flux guiding member 164 can function to concentrate and direct the magnetic fields of the first docking magnet 158 and the second docking magnet 160 to limit their interference on the stand charging module 148.

Figure 4:
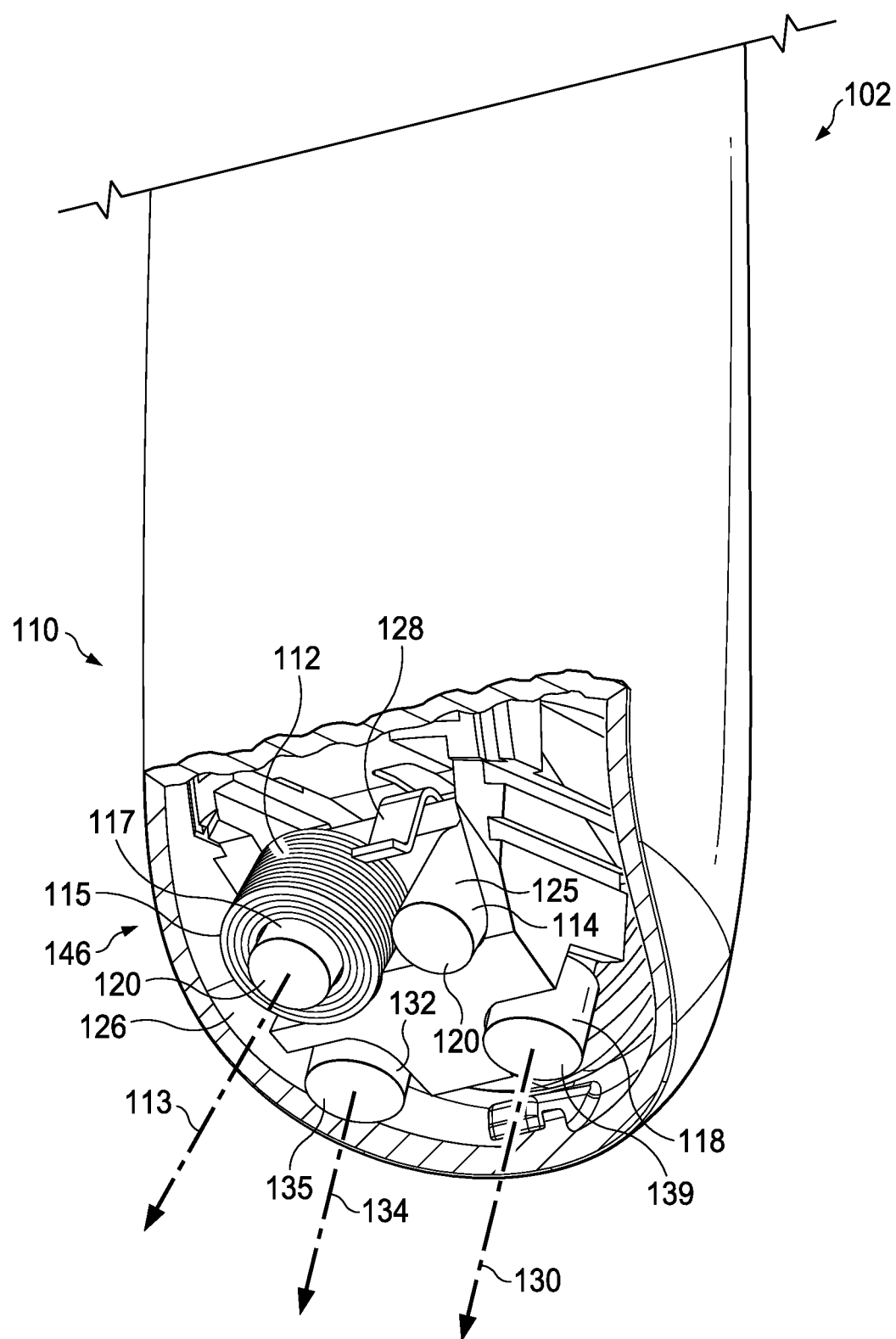
FIG. 4 is a partial cutaway view of a first end portion of a handle.
Figure 5:
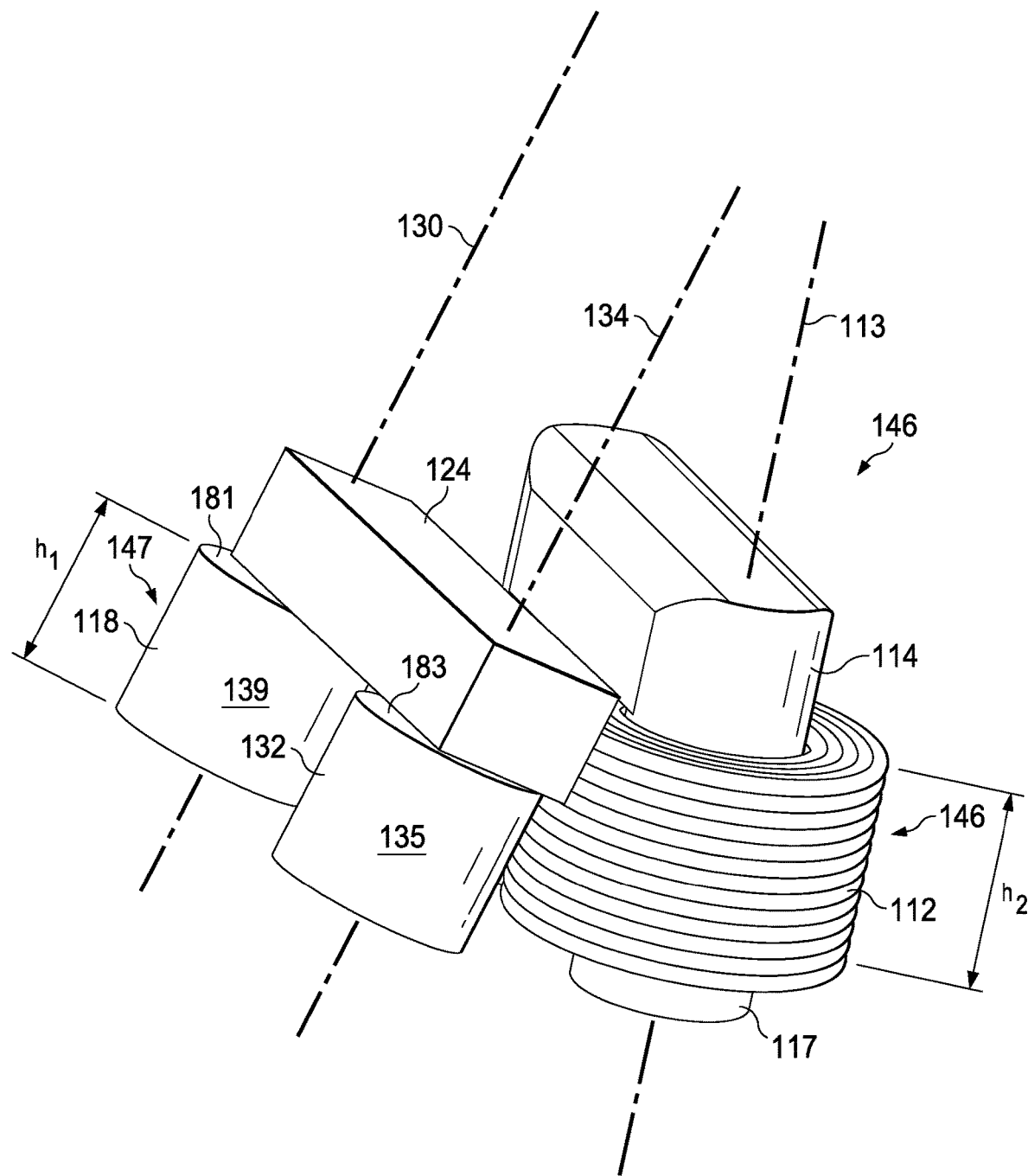
FIG. 5 is an isometric view of docking magnets and a charging module of a handle with various components removed for clarity of illustration.

FIG. 4 is an isometric partial cutaway view of the handle 102 to show an example relative positional placement of the handle docking magnets 118, 132 and handle inductive charging coil 112 within the first end portion 110. FIG. 5 is an isometric view of the docking magnets 118, 132 of the handle 102 and the handle inductive charging coil 112 with various components removed for clarity of illustration. In the illustrated configuration, docking magnets 118, 132 are contacting an inner contact surface 126 of the outer surface contact area 138 (FIG. 2). The first docking magnet 118 defines an axis of polarity 130 that runs through the two poles of the magnet. Similarly, the second docking magnet 132 defines an axis of polarity 134 that runs through the two poles of that magnet. The polarity of the first docking magnet 118 can be opposite of the polarity of the second docking magnet 132. The first docking magnet 118 has an outer surface 139 and the second docking magnet 132 has an outer surface 135. The heights of the first docking magnet 118 and the second docking magnet 132 shown in FIG. 5 are substantially similar, although this disclosure is not so limited. In some embodiments, the height ($h_1$) of the first docking magnet 118 and the second docking magnet 132 can be between about 2 mm and about 4 mm. More preferably, the height ($h_1$) is about 3 mm. The handle inductive charging coil 112 has an outer surface 115 and defines a coil axis 113. The handle inductive charging coil 112 can have a height ($h_2$) between about 3.5 mm and about 5.5 mm. More preferably, the height ($h_2$) is about 4.3 mm. In some cases, the coil axis 113 is coaxial with the portion of the first handle flux guiding member 114 extending through the handle inductive charging coil 112, shown as first leg 117. The first handle flux guiding member 114 can also include a second leg 125, as described in more detail below. As shown in FIG. 5, the coil axis 113 can be non-parallel to the axes of polarity 130, 134 of the docking magnets 118, 132, such that the axes of polarity 130, 134 of the docking magnets 118, 132 are tilted towards the coil axis 113. Such arrangement can allow for the handle docking system 147 and the handle charging module 146 to be placed in close proximity to each other while conforming to the internal space of the first end portion 110 of the handle 102, which may have a rounded profile.

Figure 6:
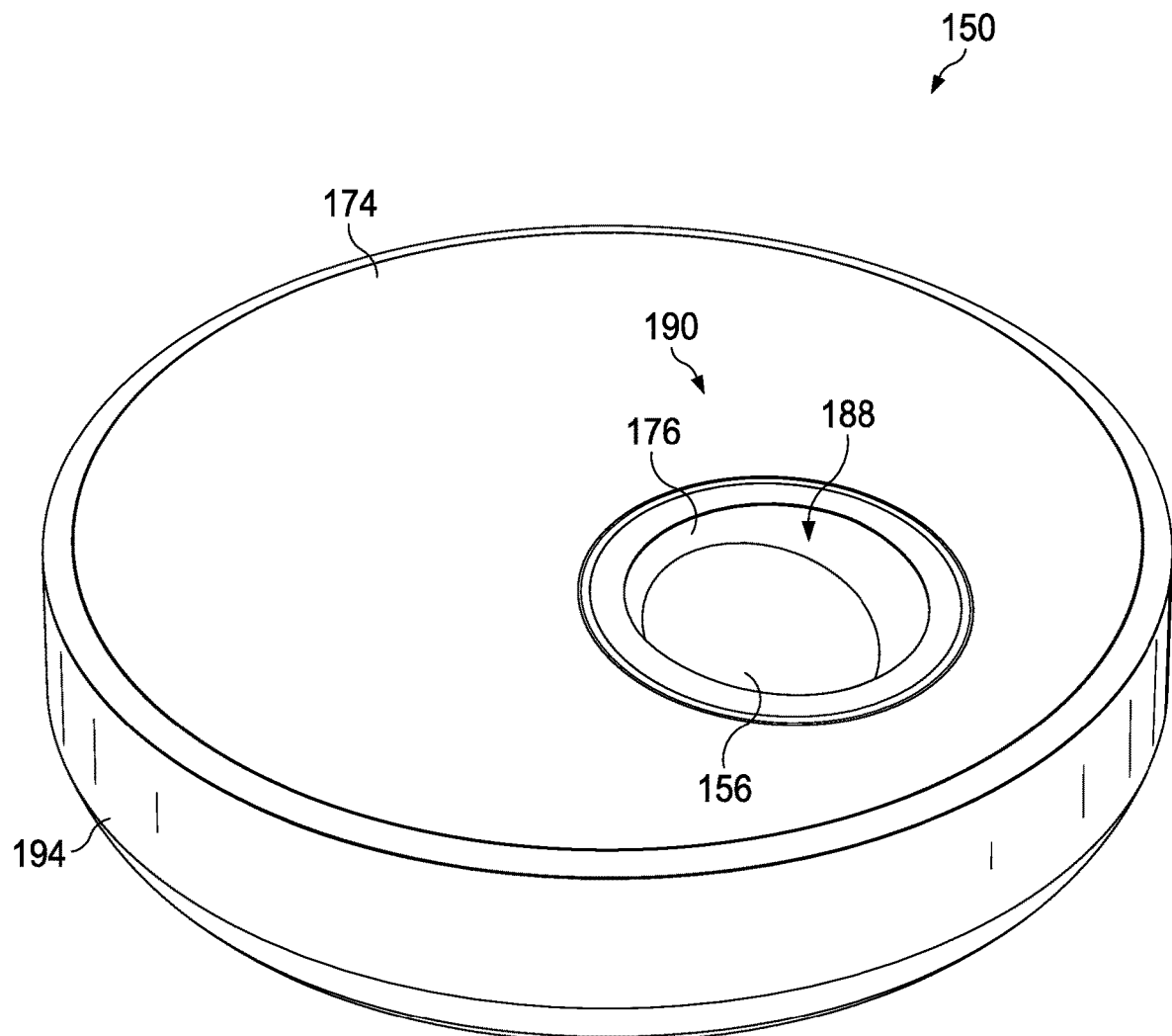
FIG. 6 is an isometric view of one non-limiting example stand.
Figure 7:
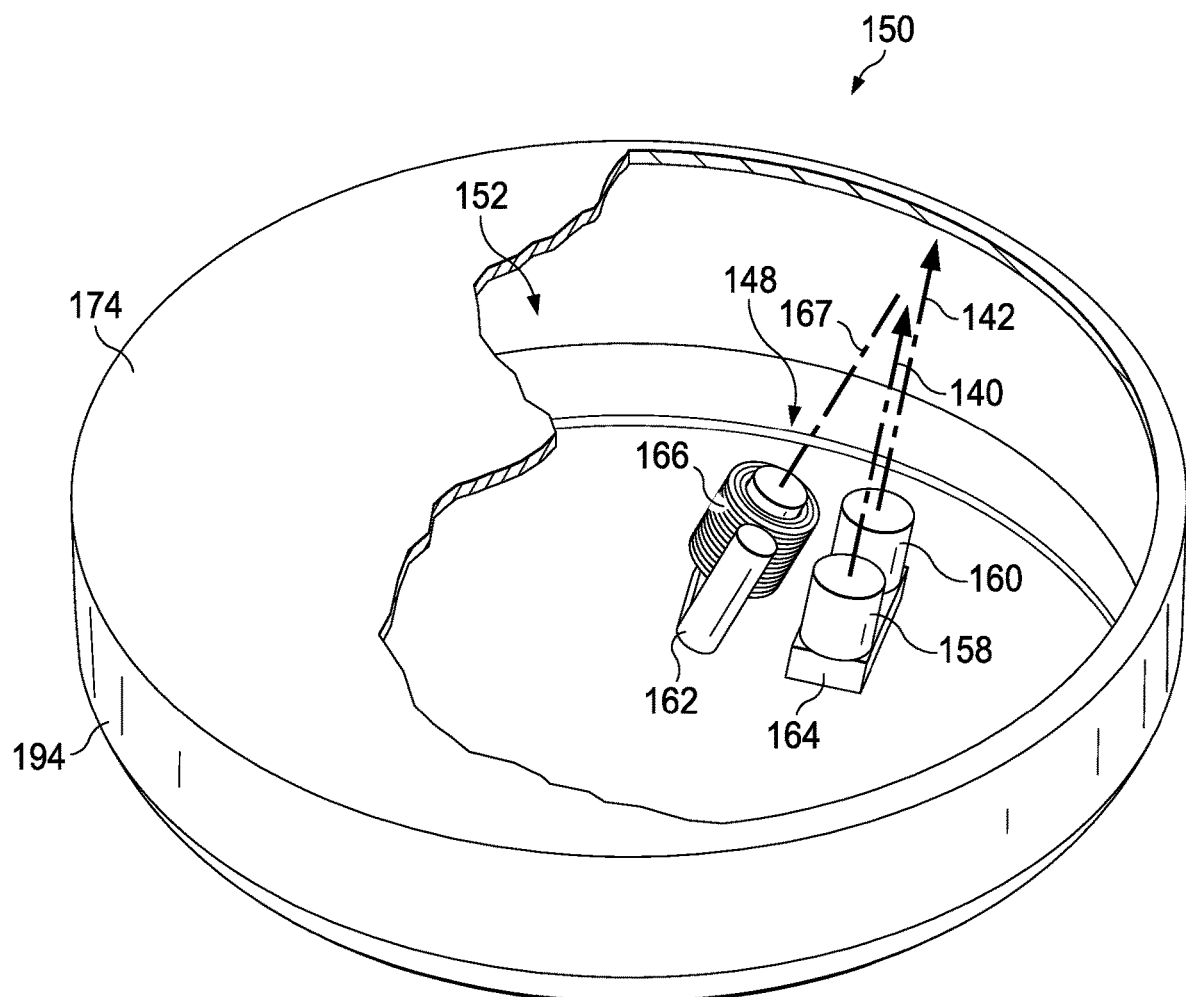
FIG. 7 is a partial cutaway view of the stand shown in FIG. 6.
Figure 8:
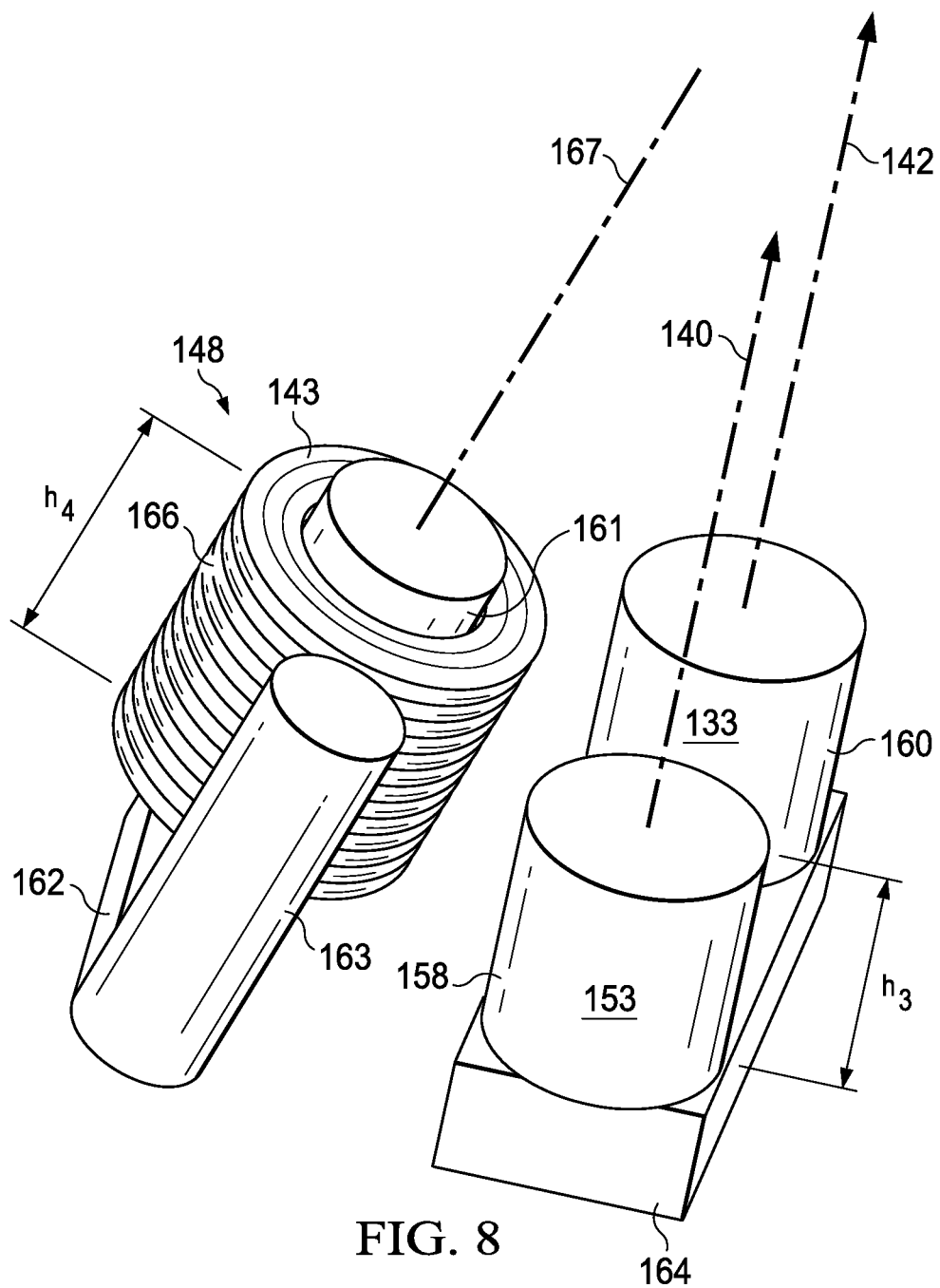
FIG. 8 is an isometric view of docking magnets and a stand inductive charging coil with various components removed for clarity of illustration.

FIG. 6 depicts an isometric view of the stand 150 and FIG. 7 depicts a partial cutaway view of FIG. 6 to show the internal cavity 152, with various components removed for clarity of illustration. FIG. 8 is an enlarged view of the docking magnets 158, 160 and the stand inductive charging coil 166 with various components removed for clarity of illustration. The stand 150 has a top surface 174 that has a handle receiving portion 190 (FIG. 6). The top surface 174 can be planar, rounded, sloped, angled, multi-faceted, or have any other suitable configuration. In some configurations, the handle receiving portion 190 may also define a recess 188 having the outer contact surface 176 that includes a bottom surface 156. Alternatively, the handle receiving portion 190 may be generally flat or have another suitable arrangement. The recess 188 is sized and configured to receive the first end portion 110 of the handle 102 when the handle 102 is in the docked position. The outer surface contact area 138 (FIG. 2) can be received into the recess 188 such that the docking magnets 118, 132 of the handle 102 magnetically interact with the docking magnets 158, 160 of the stand 150 that are positioned beneath the bottom surface 156 (shown as inner surface 172 in FIG. 3). In some configurations, the docking magnets 158, 160 are in contact with the underside of the bottom surface 156, to minimize the distance between the related docking magnets of the handle 102 to increase the magnetic attraction force. The docking magnets 158, 160, as shown in FIG. 7, can each have a respective axis of polarity 140, 142 extending through the poles of the magnet. The polarity of the docking magnet 158 can be opposite of the polarity of the docking magnet 160 and be configured to magnetically interact with the complementary docking magnets 132 and 118 of the handle 102. In some configurations, the axes of polarity 140, 142 can be generally parallel and co-planar to the axes of polarity 130, 134 of the handle 102 when the handle 102 is docked to the stand 150. In other configurations, the axes of polarity 140, 142 can be generally non-parallel and/or non-planar to the axes of polarity 130, 134 of the handle 102 when the handle 102 is docked to the stand 150. Further, the axis of polarity 130 can be non-parallel to axis of polarity 134 and the axis of polarity 140 can be non-parallel to axis of polarity 142. As shown in FIG. 8, the first docking magnet 158 has an outer surface 153 and the second docking magnet 160 has an outer surface 133. The heights of the first docking magnet 158 and the second docking magnet 160 shown in FIG. 6 are substantially similar, although this disclosure is not so limited. In some embodiments, the height ($h_3$) of the first docking magnet 158 and the second docking magnet 160 can be between about 3.5 mm and about 6 mm. More preferably, the height ($h_3$) is about 4.6 mm. The stand inductive charging coil 166 has an outer surface 143 and defines a coil axis 167. The stand inductive charging coil 166 can have a height ($h_4$) between about 5 mm and about 9 mm. More preferably, the height ($h_4$) is about 7.1 mm. A portion of the stand flux guiding member 162 can extend through the stand inductive charging coil 166, shown as first leg 161. The stand flux guiding member 162 can also include a second leg 163, as described in more detail below. As shown in FIGS. 7-8, the coil axis 167 can be non-parallel to the axes of polarity 140, 142 of the stand docking magnets 158, 160.

Figure 9:
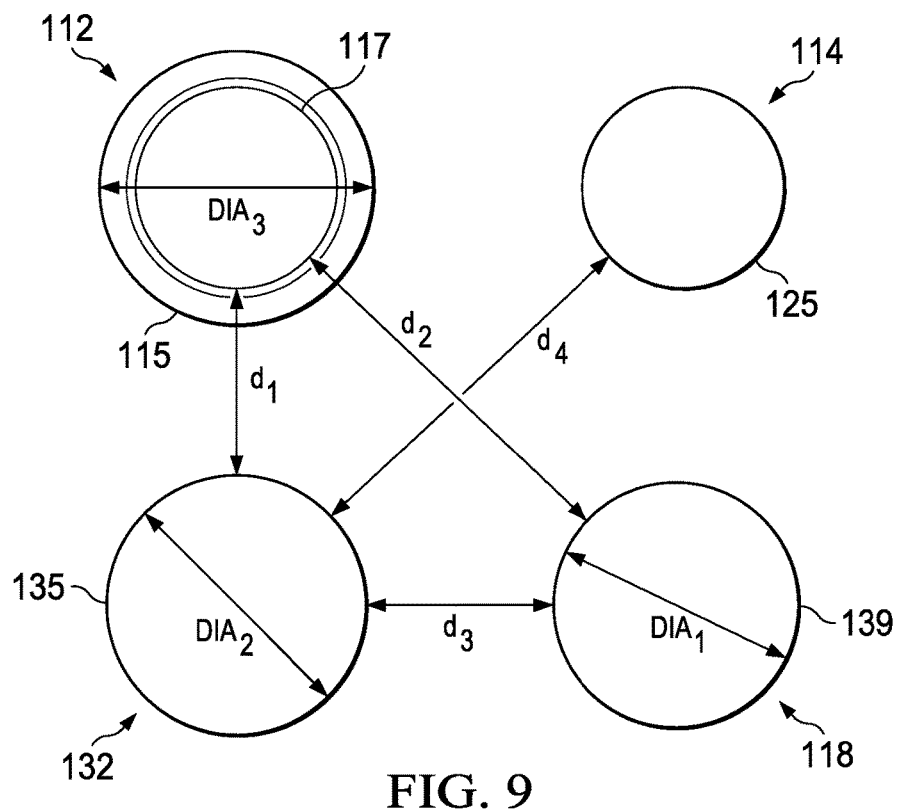
FIG. 9 schematically depicts an end view of a first docking magnet, a second docking magnet, a handle inductive charging coil, and a first handle flux guiding member of a handle according to one embodiment.

FIG. 9 schematically depicts an end view of the first docking magnet 118 and the second docking magnet 132 of the handle 102 showing the ends of the first docking magnet 118 and the second docking magnet 132 that are positioned in close proximity to the inner contact surface 126 (FIG. 3) of the handle 102. Also, schematically depicted in FIG. 9 is an end view of the handle inductive charging coil 112 and the first handle flux guiding member 114, with the first leg 117 of the first handle flux guiding member 114 received into the handle inductive charging coil 112 and the second leg 125 of the first handle flux guiding member 114 horizontally offset from the first leg 117. Due to the guiding of the magnetic field by the second handle flux guiding member 124 (FIG. 5), each of the first docking magnet 118 and second docking magnet 132 can be positioned closely to the handle inductive charging coil 112. As schematically depicted in FIG. 9, distance ($d_1$) is shown as the shortest distance between an outer surface 135 of the second docking magnet 132 and an outer side surface of the first leg 117 of the first handle flux guiding member 114. The distance ($d_1$) can be in the range of about 1.5 mm to about 5 mm. More preferably, the distance ($d_1$) is about 2.4 mm. As shown in FIG. 9, the shortest distance between an outer surface 139 of the first docking magnet 118 and the outer side surface of the first leg 117 of the first handle flux guiding member 114 is shown as distance ($d_2$). Distance ($d_2$) can be in the range of about 3 mm to about 7.6 mm. More preferably, the distance (d2) is about 5.2 mm. The shortest distance ($d_3$) between the outer surface 135 of the second docking magnet 132 and the outer surface 139 of the first docking magnet 118 can be in the range of about 3.5 mm to about 5.5 mm. More preferably, the distance ($d_3$) is about 4.3 mm. The shortest distance between the outer surface 135 of the second docking magnet 132 and the outer surface of the second leg 125 of the first handle flux guiding member 114 is shown as distance ($d_4$). Distance ($d_4$) can be in the range of 5 about mm to 8 about mm. More preferably, the distance ($d_4$) is about 5.9 mm. As the first docking magnet 118 and the second docking magnet 132 may be tilted relative to each other and/or first and second legs 117, 125 of the first handle flux guiding member 114, the distances ($d_1$), ($d_2$), ($d_3$), and ($d_4$) are measured across the shortest path between the outer surfaces of the two objects being measured. The diameters of the first docking magnet 118, the second docking magnet 132, shown as $DIA_1$, and $DIA_2$, respectively, can be in the range of about 2.5 mm to about 4 mm. More preferably, the diameters $DIA_1$, and $DIA_2$ are about 3.2 mm. The outer diameter of the first handle inductive charging coil 112, shown as $DIA_3$, can be in the range of about 5 mm to about 8 mm. More preferably, the diameter $DIA_3$ is about 6.3 mm. The inner diameter of the first handle inductive charging coil 112 can be in the range of about 2.5 mm to about 4.5 mm. More preferably, the inner diameter of the first handle inductive charging coil 112 is about 3.2 mm. The outer diameter of the first leg 117 can be similar to, or slightly smaller than the inner diameter of the first handle inductive charging coil 112. The diameter of the second leg 125 can be similar to the diameter of the first leg 117, or be larger or smaller than the diameter of the first leg 117.

Figure 10:
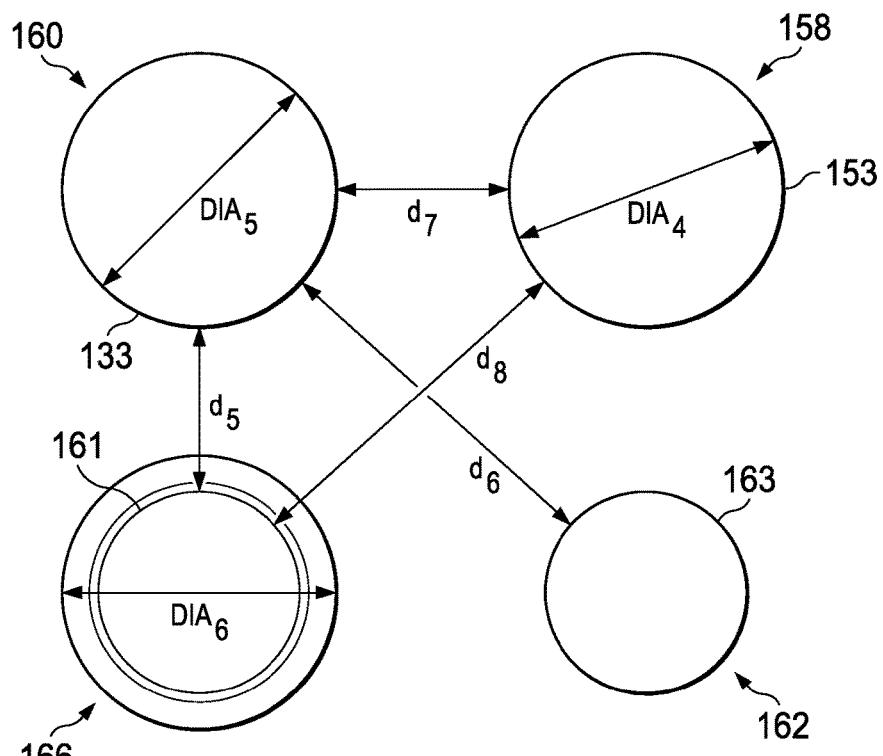
FIG. 10 schematically depicts an end view of a first docking magnet, a second docking magnet, a stand inductive charging coil, and a stand handle flux guiding member of a stand according to one embodiment.

FIG. 10 schematically depicts an end view of the first docking magnet 158 and the second docking magnet 160 of the stand 150 showing the ends of the first docking magnet 158 and the second docking magnet 160 that are positioned in close proximity to the inner surface 172 of the stand 150, as shown in FIG. 3. Also, schematically depicted in FIG. 10 is an end view of the stand inductive charging coil 166 and the stand flux guiding member 162, with the first leg 161 received into the stand inductive charging coil 166 and the second leg 163 of the stand flux guiding member 162 horizontally offset from the first leg 161. Due to the guiding of the magnetic field by the stand flux guiding member 164 (FIG. 8), each of the first docking magnet 158 and the second docking magnet 160 of the stand 150 can be positioned closely to the stand inductive charging coil 166. As schematically depicted in FIG. 10, distance ($d_5$) is shown as the shortest distance between an outer surface 133 of the second docking magnet 160 and an outer side surface of the first leg 161 of the stand flux guiding member 162. The distance ($d_5$) can be in the range of about 1.5 mm to about 5 mm. More preferably, the distance ($d_5$) is about 2.2 mm. As shown in FIG. 10, the shortest distance between an outer surface 153 of the first docking magnet 158 and the outer side surface of the first leg 161 of the stand flux guiding member 162 is shown as distance ($d_6$). Distance ($d_6$) can be in the range of about 3 mm to about 6 mm. More preferably, the distance ($d_6$) is about 5.0 mm. The shortest distance ($d_7$) between the outer surface 133 of the second docking magnet 160 and the outer surface 153 of the first docking magnet 158 can be in the range of about 2 mm to about 4 mm. More preferably, the distance ($d_7$) is about 2.7 mm. The shortest distance between the outer surface 133 of the second docking magnet 160 and the outer surface of the second leg 163 of the stand flux guiding member 162 is shown as distance ($d_8$). Distance ($d_8$) can be in the range of about 5 mm to about 8 mm. More preferably, the distance ($d_8$) is about 6.2 mm. As the first docking magnet 158 and the second docking magnet 160 may be tilted relative to each other and/or the first and second legs 161, 163 of the stand flux guiding member 162, the distances ($d_5$), ($d_6$), ($d_7$), and ($d_8$) are measured across the shortest path between the outer surfaces of the two objects being measured. The diameters of the first docking magnet 158, the second docking magnet 160, shown as $DIA_4$, and $DIA_5$, respectively, can be in the range of about 3.5 mm to about 6 mm. More preferably, the diameters $DIA_4$, and $DIA_5$ are about 4.8 mm. The outer diameter of the stand inductive charging coil 166, shown as $DIA_6$, can be in the range of about 3 mm to about 9 mm. More preferably, the diameter $DIA_6$ is about 7.1 mm. The inner diameter of the stand inductive charging coil 166 can be in the range of about 3 mm to about 6 mm. More preferably, the inner diameter of the stand inductive charging coil 166 is 4.2 mm. The outer diameter of the portion of the first leg 161 can be similar to, or slightly smaller than the inner diameter of the first handle inductive charging coil 112. The diameter of the second leg 163 can be similar to the diameter of the first leg 161, or be larger or smaller than the diameter of the first leg 161.

Figure 11:
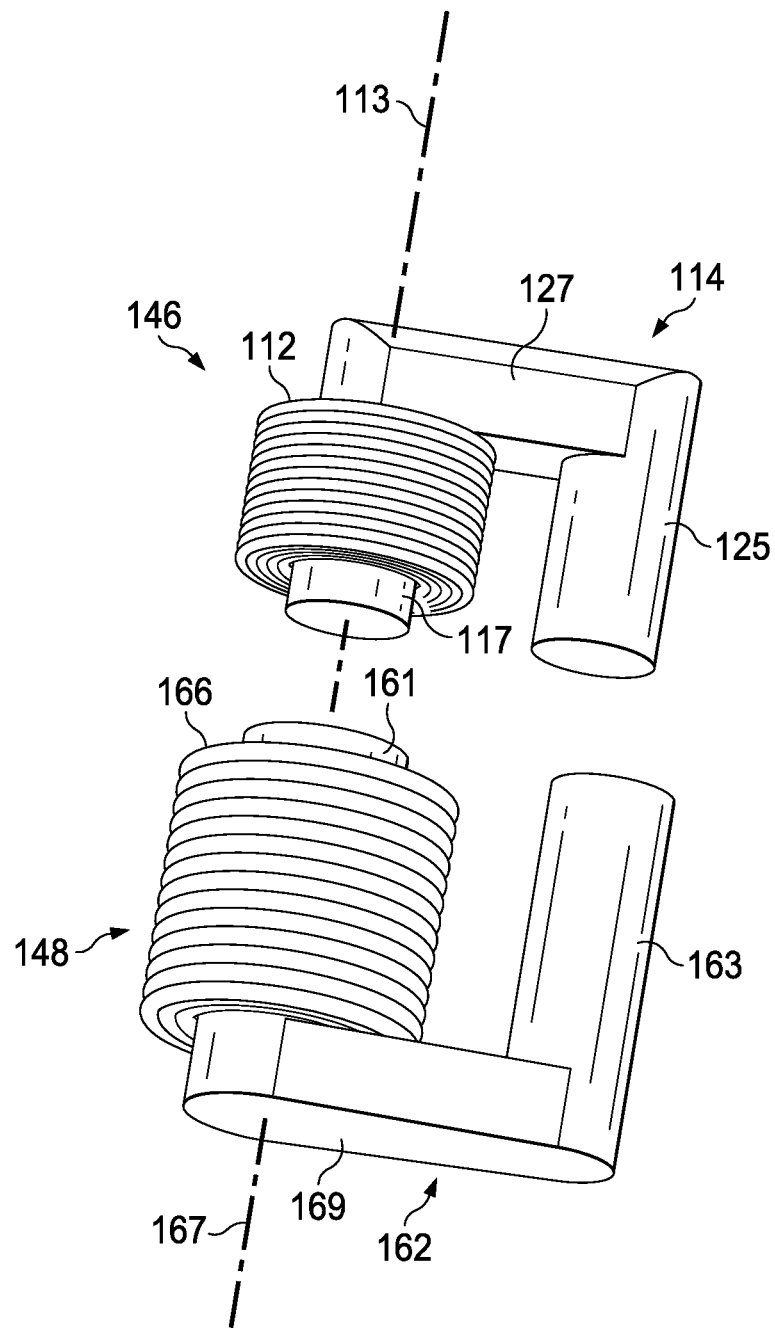
FIG. 11 is an isometric view of example components of a charging module of a handle and a charging module of a stand.

Referring now to FIG. 11, an example relative position of the handle docking system 147 to the stand charging module 148 is depicted when the handle 102 is docked to the stand 150, as shown in FIG. 1. As shown, the coil axis 113 defined by the handle inductive charging coil 112 can be generally axially aligned with the coil axis 167, defined by the stand inductive charging coil 166. The first handle flux guiding member 114 is shown to have the first leg 117 extending through the handle inductive charging coil 112 and another portion extending outside the handle inductive charging coil 112. In the illustrated embodiment, a yoke 127 and the second leg 125 extend outside the handle inductive charging coil 112, with the second leg 125 being generally parallel to the first leg 117. Similarly, the first stand flux guiding member 162 is shown to have a first leg 161 extending through the stand inductive charging coil 166 and another portion extending outside the stand inductive charging coil 166. In the illustrated embodiment, a yoke 169 and a second leg 163 extend outside the stand inductive charging coil 166, with the second leg 163 being generally parallel to the first leg 161. The first leg 117 of the first handle flux guiding member 114 can be generally axially aligned with the first leg 161 of the first stand flux guiding member 162 when the handle 102 is docked to the stand 150.

Figure 12:
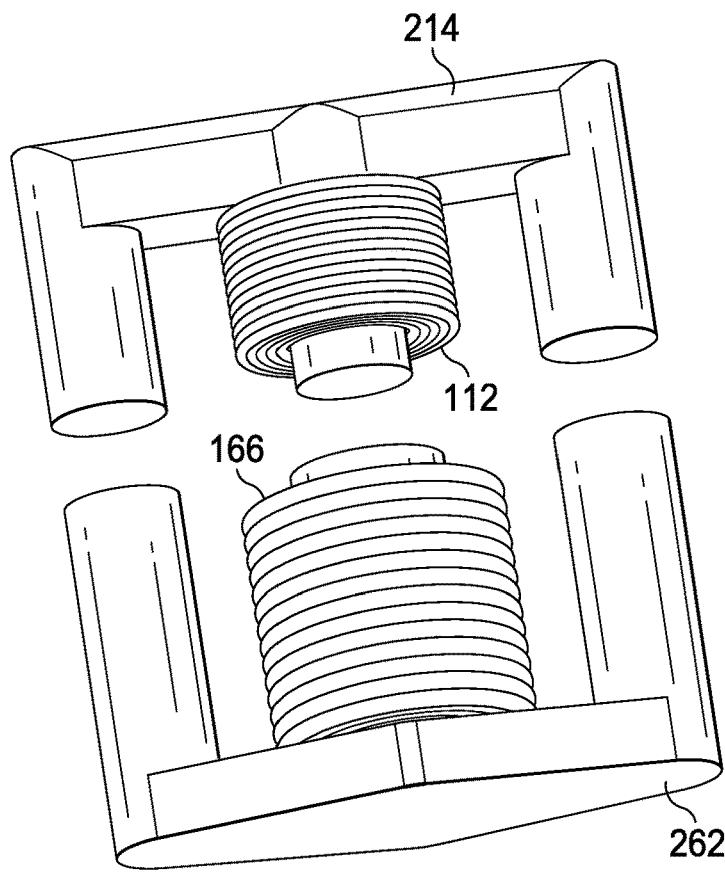
FIG. 12 is an isometric view of example components of another charging module of a handle and a charging module of a stand.
Figure 13:
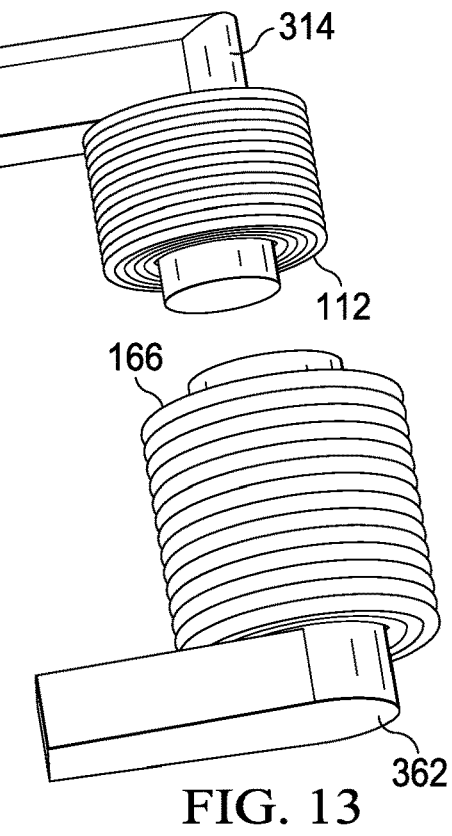
FIG. 13 is an isometric view of example components of yet another charging module of a handle and a charging module of a stand.

While the first handle flux guiding member 114 is shown to have a first leg 117, a second leg 125, and a yoke 127 and the first stand flux guiding member 162 is shown to have the first leg 161, the second leg 163, and a yoke 169, this disclosure is not limited. Indeed, each of the first handle flux guiding member 114 and the first stand flux guiding member 162 can have any number of configurations without departing from the scope of the present disclosure. By way of non-limiting examples, FIGS. 12-13 depict other example first handle flux guiding members 114 and first stand flux guiding members 162. FIG. 12 depicts a first handle flux guiding member 214 and a first stand flux guiding member 262 that each have an E-shaped cross section. FIG. 13 depicts a first handle flux guiding member 314 and a first stand flux guiding member 362 that have an L-shaped cross section. As shown in FIGS. 12-13, each of the first handle flux guiding members 214, 314 and the first stand flux guiding members 262, 362 have a portion that extends through the handle inductive charge coils 112 and the stand inductive charging coils 166, respectively.

Figure 14:
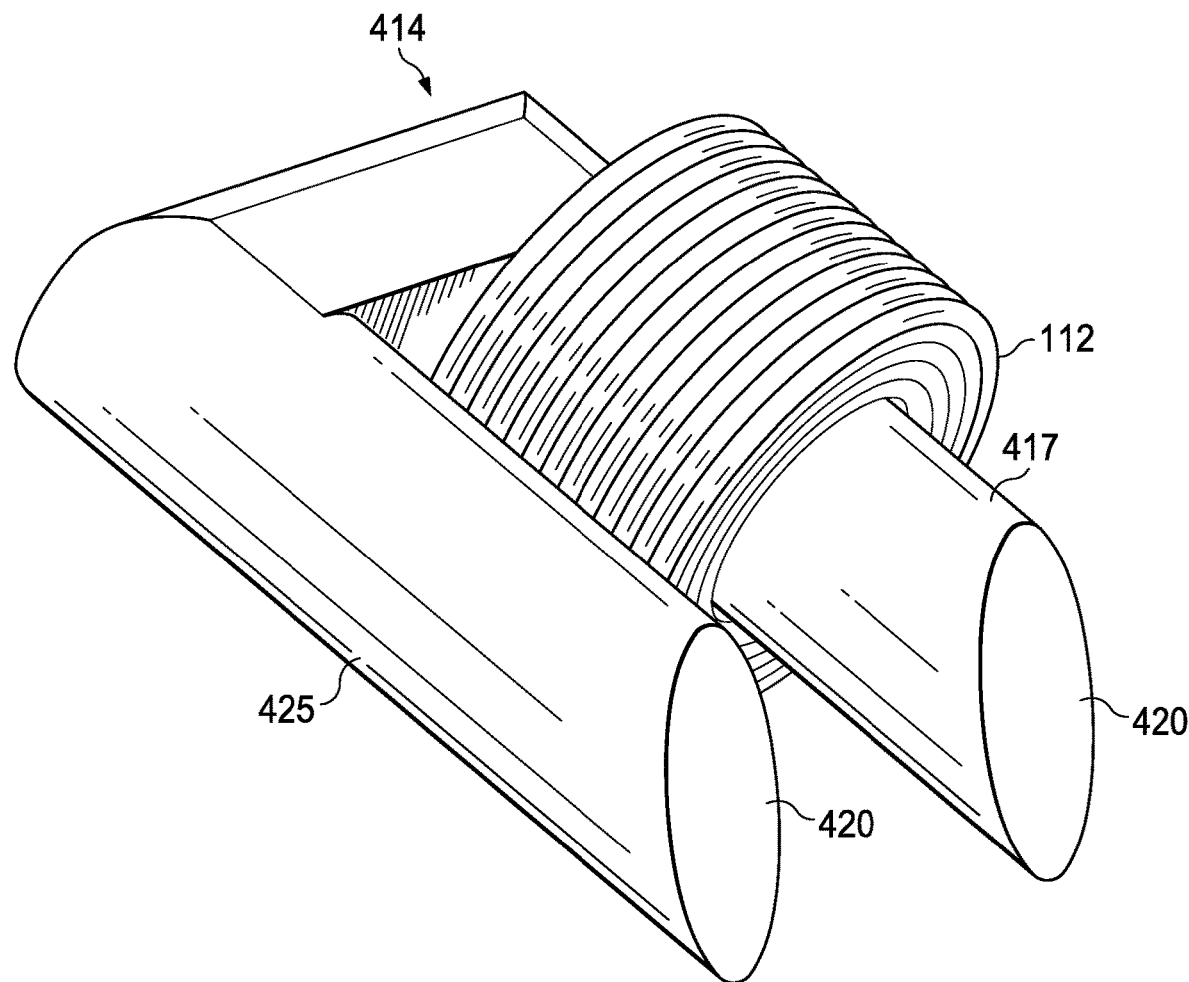
FIG. 14 is an isometric view of components of another example charging module of a handle.

Various aspects of the charging modules 146, 148 and/or the docking systems 147, 149 may be physically configured to aid in the internal placement in relatively confined spaces. For instance, FIG. 14 depicts another example embodiment of first handle flux guiding member 414 that is configured to concentrate the magnetic flux generated by the handle inductive charging coil 112 during a charge operation. In this embodiment, each of the first leg 417 and the second leg 425 has an angled end surface 420 that is configured so that the first handle flux guiding member 414 can be accommodated inside the handle 102. More particularly, the legs 417, 425 can be positioned in close proximity to the inner contact surface 126 (FIG. 3) of the handle 102 such that a gap between the legs 417, 425 and the inner contact surface 126 is reduced or eliminated. The arrangement of the angled end surface 420 can vary. For instance, the angled end surface 420 can span the entire end of the first handle flux guiding member 414 to form a bevel, as shown in FIG. 14, or in other configurations only a portion of the end of the first handle flux guiding member 414 can be angled to for a chamfer. In some configurations, the angled end surfaces 420 directly contact the inner contact surface 126. Further, the first stand flux guiding member 162 can also have slanted surfaces similar to the angled end surfaces 420 in order to provide for the desired placement of the stand charging module 148 within the stand 150. In some configurations, one or more of the docking magnets 118, 132, 158, 160 have angled end surfaces to aid in bringing the magnets into close proximity to the various internal surfaces of the handle 102 or the stand 150.

FURTHER NON-LIMITING DESCRIPTION OF THE DISCLOSURE

The following paragraphs constitute a further non-limiting description of the disclosure in a form suitable for appending to the claim section if later desired.

A. A personal care product system comprising:
 a stand (150);
 a first stand permanent docking magnet (158) positioned within the stand (150);
 a stand inductive charging coil (166) positioned within the stand (150);
 a handle (102) removably mounted to the stand (150);
 a rechargeable battery (119) positioned within the handle (102);
 a first handle permanent docking magnet (118) positioned within the handle (102) configured to generate an attraction force sufficient to hold the handle (102) to the stand (150) when placed in proximity to the first stand permanent docking magnet (158);
 a handle inductive charging coil (112) positioned within the handle (102), wherein the stand inductive charging coil (166) is configured to generate a magnetic field that penetrates the handle inductive charging coil (112) to charge the rechargeable battery (119); and
 a handle flux guiding member (124) in close proximity to a surface (181) of the first handle permanent docking magnet (118).

B. The personal care product system according to paragraph A further comprising a second handle permanent docking magnet (132) positioned within the handle (102) wherein the handle flux guiding member (124) connects the first handle permanent docking magnet (118) and the second handle permanent docking magnet (132).

C. The personal care product system according to any one of the preceding paragraphs further comprising a second stand permanent docking magnet (160) positioned within the stand (150) and a stand flux guiding member (164), wherein the stand flux guiding member (164) connects the first stand permanent docking magnet (158) and the second stand permanent docking magnet (160).

D. The personal care product system according to any one of the preceding paragraphs further comprising a stand flux guiding member (162, 262, 362) having a first leg (161) positioned within the stand inductive charging coil (166), wherein an outer surface (153) of the first stand permanent docking magnet (158) and an outer side surface of the first leg (161) are positioned within 7 mm ($d_8$) of each other.

E. The personal care product system according to any one of the preceding paragraphs further comprising and a handle flux guiding member (114, 214, 314, 414) having a first leg (117) positioned within the handle inductive charging coil (112), wherein an outer surface (139) of the first handle permanent docking magnet (118) and an outer side surface of the first leg (117) are positioned within 6 mm ($d_2$) of each other.

F. The personal care product system according to paragraph B wherein an outer surface (135) of the second handle permanent docking magnet (132) and an outer side surface of the first leg (117) are positioned within 3 mm ($d_1$) of each other.

G. The personal care product system according to paragraph C wherein an outer surface (160) of the second stand permanent docking magnet (160) and an outer side surface of the first leg (161) are positioned within 3 mm ($d_5$) of each other.

H. The personal care product system according to any one of the preceding paragraphs wherein the handle flux guiding member (124) has an L-shaped cross section.

I. The personal care product system according to any one of the preceding paragraphs wherein the handle (102) has an outer contact surface (138) and an opposing inner surface (126), the stand (150) has an outer contact surface (176) and an opposing inner surface (172), the outer contact surface (176) of the stand (150) and the outer contact surface (138) of the handle (102) are in direct contact when the handle (102) is held in the stand (150).

J. The personal care product system according to paragraph I wherein the first handle permanent docking magnet (118) directly contacts the inner surface (126) of the handle (102) and the first stand permanent docking magnet (158) directly contacts the inner surface (172) of the stand (150).

K. The personal care product system according to paragraph J wherein the first handle permanent docking magnetic (158) has an angled end surface that directly contacts the inner surface (126) of the handle (102).

L. The personal care product system according to paragraph J or K wherein the first stand permanent magnetic (158) has an angled end surface that directly contacts the inner surface (172) of the stand (150).

M. The personal care product system according to any one of paragraphs I-L wherein the handle (102) has a spring member (128) forcing the first handle permanent docking magnet (118) against the inner surface (126) of the handle 9102).

N. The personal care product system according to any one of the preceding paragraphs wherein the handle inductive charging coil (112) has a center axis generally axially aligned with a center axis of the stand inductive charging coil (166).

O. The personal care product system according to any one of the preceding paragraphs wherein the handle flux guiding member (124) is a bar.

P. A personal care product system comprising:
   a stand (150);
   a first stand permanent docking magnet (158) positioned within the stand (150);
   a stand inductive charging coil (166) positioned within the stand (150);
   a handle (102) removably mounted to the stand (150);
   a rechargeable battery (119) positioned within the handle (102);
   a first handle permanent docking magnet (118) positioned within the handle (102) configured to generate an attraction force sufficient to hold the handle (102) to the stand (150) when placed in proximity to the first stand permanent docking magnet (158);
   a handle inductive charging coil (112) positioned within the handle (102), wherein the stand inductive charging coil (166) is configured to generate a magnetic field that penetrates the handle inductive charging coil (112) to charge the rechargeable battery (119) when placed in proximity to the handle inductive charging coil (112);
   a handle flux guiding member (114, 214, 314, 414) having at least a portion positioned within the handle inductive charging coil (112); and
   a stand flux guiding member (162, 262, 362) having at least a portion positioned within the stand inductive charging coil (166).

Q. The personal care product system according to paragraph P wherein
   an outer surface (153) of the first stand permanent docking magnet (158) and an outer side surface of the portion positioned within the stand inductive charging coil (166) are positioned within 7 mm ($d_8$) of each other; and
   an outer surface (139) of the first handle permanent docking magnet (118) and an outer side surface of the portion positioned within the handle inductive charging coil (112) are positioned within 6 mm ($d_2$) of each other.

R. The personal care product system according to any one of paragraphs P-Q wherein
   at least another portion of the handle flux guiding member (114, 214, 314, 414) extends external to the handle inductive charging coil (112); and
   at least another portion of the stand flux guiding member (162, 262, 362) extends external to the stand inductive charging coil (166).

S. The personal care product system according to any one of paragraphs P-R wherein the portion of the handle flux guiding member (114, 214, 314, 414) positioned within the handle inductive charging coil (112) is generally axially aligned with the portion of the stand flux guiding member (162, 262, 362) positioned within the stand inductive charging coil (166).

T. The personal care product system according to any one of paragraphs P-S wherein the handle inductive charging coil (112) has a center axis that is generally axially aligned with a center axis of the stand inductive charging coil (166) when the handle is held in the stand (150).

U. The personal care product system according to any one of paragraphs P-T wherein a center axis of the first handle permanent docking magnet (118) is axially aligned with a center axis of the first stand permanent docking magnet (158) when the handle (102) is held to the stand (150).

V. The personal care product system according to any one of paragraphs P-U wherein the stand flux guiding member (162, 262, 362) has a U-shaped cross section or an E-shaped cross section.

W. The personal care product system according to any one of paragraphs P-V wherein the handle flux guiding member (114, 214, 314, 414) has a U-shaped cross section or an E-shaped cross section.

X. The personal care product system according to any one of paragraphs P-W wherein either or both of the handle flux guiding member (114, 214, 314, 414) and the stand flux guiding member (162, 262, 362) comprises a ferrimagnetic material or a ferromagnetic material.

Y. The personal care product system according to any one of paragraphs P-X wherein the handle (102) has an outer contact surface (138) and an opposing inner surface (126), the stand (150) has an outer contact surface (176) and an opposing inner surface (172), the outer contact surface of the stand (176) and the outer contact surface (138) of the handle (102) are in direct contact when the handle (102) is held to the stand (150).

Z. The personal care product system according to paragraph Y wherein the handle flux guiding member (114, 214, 314, 414) directly contacts the inner surface (126) of the handle (102) and the stand flux guiding member (162, 262, 362) directly contacts the inner surface (172) of the stand (150).

AA. The personal care product system according to paragraphs Y or Z wherein the handle flux guiding member (114, 214, 314, 414) has a leg (117, 125, 417, 425) with an angled end surface (420) directly contacting the inner surface (126) of the handle (102).

BB. The personal care product system according to any one of paragraphs Y-AA wherein the stand flux guiding member (162, 262, 362) has a leg with an angled end surface (420) directly contacting the inner surface (172) of the stand (150).

CC. The personal care product system according to any one of paragraphs Y-BB wherein the handle (102) has a spring member (128) forcing the first handle permanent docking magnet (118) against the inner surface (126) of the handle (102).

DD. A personal care product system comprising:
   a stand (150);
   a first stand permanent docking magnet (158) positioned within the stand (150);
   a stand inductive charging coil (166) positioned within the stand (150);
   a handle (102) removably mounted to the stand (150);
   a rechargeable battery (119) positioned within the handle (102);
   a first handle permanent docking magnet (118) positioned within the handle (102) configured to generate an attraction force sufficient to hold the handle (102) to the stand (150) when placed in proximity to the first stand permanent docking magnet (158);
   a handle inductive charging coil (112) positioned within the handle (102), wherein the stand inductive charging coil (166) is configured to generate a magnetic field that penetrates the handle inductive charging coil (112) to charge the rechargeable battery (119);
   a first handle flux guiding member (114, 214, 314, 414) having at least a portion positioned within the handle inductive charging coil (112);
   a second handle flux guiding member (124) in close proximity to a surface (181) of the first handle permanent docking magnet (118);
   a first stand flux guiding member (162, 262, 362) having at least a portion positioned within the stand inductive charging coil (166).

EE. The personal care product system according to paragraph DD wherein
an outer surface (153) of the first stand permanent docking magnet (158) and an outer side surface of the portion positioned within the stand inductive charging coil (166) are positioned within 7 mm (d$_8$) of each other; and
an outer surface (139) of the first handle permanent docking magnet (118) and an outer side surface of the portion positioned within the handle inductive charging coil (112) are positioned within 6 mm (d$_2$) of each other.

FF. The personal care product system according to according to any one of paragraphs DD-EE wherein;
at least another portion of the first handle flux guiding member (114, 214, 314, 414) extends external to the handle inductive charging coil (112); and
at least another portion of the first stand flux guiding member (162, 262, 362) extends external to the stand inductive charging coil (166).

GG. The personal care product system according to any one of paragraphs DD-FF wherein the portion of the first handle flux guiding member (114, 214, 314, 414) positioned within the handle inductive charging coil (112) is generally axially aligned with the portion of the first stand flux guiding member (162, 262, 362) positioned within the stand inductive charging coil (166) when the handle (102) is held to the stand (150).

HH. The personal care product system according to any one of paragraphs DD-GG wherein the handle inductive charging coil (112) has a center axis that is generally axially aligned with a center axis of the stand inductive charging coil (166) when the handle (102) is held in the stand (150).

II. The personal care product system according to any one of paragraphs DD-HH further comprising a second stand flux guiding member (164) in close proximity to a surface of the first stand permanent docking magnet (158).

JJ. The personal care product system according to paragraph II wherein the second handle flux guiding member (124) is generally parallel to the second stand flux guiding member (164) when the handle (102) is held in the stand (150).

KK. The personal care product system according to any one of paragraphs DD-JJ wherein the first flux guiding member (162, 262, 362) of the stand (150) has a U-shaped cross section or an E-shaped cross section and the first flux guiding member of the handle (114, 214, 314, 414) has a U-shaped cross section or an E-shaped cross section.

LL. The personal care product system according to any one of paragraphs DD-KK wherein the second handle flux guiding member (124) is bar-shaped.

MM. The personal care product system according to any one of paragraphs DD-LL wherein one or more of the first and second handle flux guiding members of the handle (114, 124) and the first stand flux guiding member (162, 262, 362) comprises a ferrimagnetic material or a ferromagnetic material.

NN. The personal care product system according to any one of paragraphs DD-MM further comprising a second handle permanent docking magnet (132) positioned within the handle (102) wherein the second handle flux guiding member (124) connects the first handle permanent docking magnet (118) and the second handle permanent docking magnet (132).

OO. The personal care product system according to any one of paragraphs DD-NN further comprising a second stand permanent docking magnet (160) positioned within the stand (150).

PP. The personal care product system according to any one of paragraphs DD-00 wherein the handle (102) has an outer contact surface (138) and an opposing inner surface (126), the stand (150) has an outer contact surface (176) and an opposing inner surface (172), the outer contact surface (176) of the stand (150) and the outer contact surface (138) of the handle (102) are in direct contact when the handle (102) is held to the stand (150).

QQ. The personal care product system according to paragraph PP wherein the first handle flux guiding member (114, 214, 314, 414) directly contacts the inner surface (126) of the handle (102) and the first stand flux guiding member (162, 262, 362) directly contacts the inner surface (172) of the stand (150).

RR. The personal care product system according to paragraphs PP or QQ wherein the handle (102) has a spring member (124) forcing the first handle permanent docking magnet (118) against the inner surface (126) of the handle (102).

The dimensions and/or values disclosed herein are not to be understood as being strictly limited to the exact numerical dimensions and/or values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A personal care product system comprising:
   a stand;
   a first stand permanent docking magnet positioned within the stand;
   a stand inductive charging coil positioned within the stand;
   a handle removably mounted to the stand;
   a rechargeable battery positioned within the handle;
   a first handle permanent docking magnet positioned within the handle configured to generate an attraction force sufficient to hold the handle to the stand when placed in proximity to the first stand permanent docking magnet;
   a handle inductive charging coil positioned within the handle, wherein the stand inductive charging coil is configured to generate a magnetic field that penetrates the handle inductive charging coil to charge the rechargeable battery; and a handle flux guiding member in close proximity to a surface of the first handle permanent docking magnet, wherein the handle flux guiding member comprises a yoke with a first leg extending through the handle inductive charging coil, a second leg extending outside the handle inductive charging coil, wherein each of the first leg and the second leg has an angled end surface.

2. The personal care product system of claim 1, further comprising a second handle permanent docking magnet positioned within the handle wherein the handle flux guiding member connects the first handle permanent docking magnet and the second handle permanent docking magnet.

3. The personal care product system of claim 1, further comprising a second stand permanent docking magnet positioned within the stand and a stand flux guiding member, wherein the stand flux guiding member connects the first stand permanent docking magnet and the second stand permanent docking magnet.

4. The personal care product system of claim 1, further comprising a stand flux guiding member having a first leg positioned within the stand inductive charging coil, wherein an outer surface of the first stand permanent docking magnet and an outer side surface of the first leg are positioned within about 7 mm of each other.

5. The personal care product system of claim 1, wherein an outer surface of the first handle permanent docking magnet and an outer side surface of the first leg are positioned within about 6 mm of each other.

6. The personal care product system of claim 2, wherein an outer surface of the second handle permanent docking magnet and an outer side surface of the first leg are positioned within about 3 mm of each other.

7. The personal care product system of claim 3, wherein an outer surface of the second stand permanent docking magnet and an outer side surface of the first leg are positioned within 3 about mm of each other.

8. The personal care product system of claim 1, wherein the handle flux guiding member has an L-shaped cross section.

9. The personal care product system of claim 1, wherein the handle inductive charging coil has a center axis generally axially aligned with a center axis of the stand inductive charging coil.

10. The personal care product system of claim 1, wherein the handle flux guiding member is a bar.

11. A personal care product system comprising:
a stand;
a first stand permanent docking magnet positioned within the stand;
a stand inductive charging coil positioned within the stand;
a handle removably mounted to the stand;
a rechargeable battery positioned within the handle;
a first handle permanent docking magnet positioned within the handle and a second handle permanent docking magnet positioned within the handle, wherein the first and second handle permanent docking magnets are configured to collectively generate an attraction force sufficient to hold the handle to the stand when placed in proximity to the first stand permanent docking magnet;
a handle inductive charging coil positioned within the handle, wherein the stand inductive charging coil is configured to generate a magnetic field that penetrates the handle inductive charging coil to charge the rechargeable battery; and
a handle flux guiding member in close proximity to a surface of the first handle permanent docking magnet and a surface of the second handle permanent docking magnet wherein the handle flux guiding member comprises a yoke with a first leg extending through the handle inductive charging coil, a second leg extending outside the handle inductive charging coil, wherein each of the first leg and the second leg has an angled end surface.

12. The personal care product system of claim 1, wherein the handle has an outer contact surface and an opposing inner surface, the stand has an outer contact surface and an opposing inner surface, the outer contact surface of the stand and the outer contact surface of the handle are in direct contact when the handle is held in the stand.

13. The personal care product system of claim 12, wherein at least one of the first handle permanent docking magnet and the second handle permanent docking magnet directly contacts the inner surface of the handle and the first stand permanent docking magnet directly contacts the inner surface of the stand.

14. The personal care product system of claim 12, wherein at least one of the first handle permanent docking magnet and the second handle permanent docking magnet has an angled end surface that directly contacts the inner surface of the handle.

15. The personal care product system of claim 12, wherein the first stand permanent docking magnet has an angled end surface that directly contacts the inner surface of the stand.

16. The personal care product system of any one of claim 11, wherein the handle has a spring member forcing the first handle permanent docking magnet against the inner surface of the handle.

17. A personal care product system comprising:
a stand;
a first stand permanent docking magnet positioned within the stand;
a stand inductive charging coil positioned within the stand;
a handle removably mounted to the stand;
a rechargeable battery positioned within the handle;
a first handle permanent docking magnet positioned within the handle configured to generate an attraction force sufficient to hold the handle to the stand when placed in proximity to the first stand permanent docking magnet;
a handle inductive charging coil positioned within the handle, wherein the stand inductive charging coil is configured to generate a magnetic field that penetrates the handle inductive charging coil to charge the rechargeable battery;
a handle flux guiding member in close proximity to a surface of the first handle permanent docking magnet, the handle flux guiding member comprises a yoke with a first leg extending through the handle inductive charging coil, a second leg extending outside the handle inductive charging coil, each of the first leg and the second leg has an angled end surface; and
a stand flux guiding member in close proximity to a surface of the first stand permanent docking magnet.

18. The personal care product system of claim 17, wherein the handle flux guiding member and the stand flux guiding member each have an L-shaped cross section.

19. The personal care product system of claim 17, wherein the handle flux guiding member and the stand flux guiding member are each a bar.

20. The personal care product system of claim 17, wherein the handle flux guiding member and the stand flux guiding member each comprises a ferrimagnetic material or a ferromagnetic material.

* * * * *